(12) United States Patent
Maruyama et al.

(10) Patent No.: US 8,914,208 B2
(45) Date of Patent: *Dec. 16, 2014

(54) BRAKE CONTROL DEVICE

(75) Inventors: Masaki Maruyama, Nagoya (JP); Masayoshi Takeda, Kariya (JP); Koji Fujiki, Kariya (JP); Daisuke Tokumochi, Anjo (JP)

(73) Assignees: Advics Co., Ltd., Kariya-Shi, Aichi-Ken (JP); Denso Corporation, Kariya-Shi, Aichi-Ken (JP)

( * ) Notice: Subject to any disclaimer, the term of this patent is extended or adjusted under 35 U.S.C. 154(b) by 117 days.

This patent is subject to a terminal disclaimer.

(21) Appl. No.: 13/698,496

(22) PCT Filed: May 18, 2011

(86) PCT No.: PCT/JP2011/061374
§ 371 (c)(1),
(2), (4) Date: Nov. 16, 2012

(87) PCT Pub. No.: WO2011/145641
PCT Pub. Date: Nov. 24, 2011

(65) Prior Publication Data
US 2013/0060433 A1 Mar. 7, 2013

(30) Foreign Application Priority Data
May 18, 2010 (JP) ................... 2010-114063

(51) Int. Cl.
*B60W 30/02* (2012.01)
*B60W 10/10* (2012.01)
(Continued)

(52) U.S. Cl.
CPC .......... *B60T 7/122* (2013.01); *B60W 30/18118* (2013.01); *B60T 2201/06* (2013.01); *B60T 7/22* (2013.01)
USPC ................... 701/53; 701/54; 701/70; 701/74; 701/87

(58) Field of Classification Search
USPC ...................... 701/53, 54, 70, 74, 87
See application file for complete search history.

(56) References Cited

U.S. PATENT DOCUMENTS

| | | | | |
|---|---|---|---|---|
| 5,954,779 | A * | 9/1999 | Dietzel | 701/87 |
| 6,939,265 | B2 * | 9/2005 | Rustige et al. | 477/84 |

(Continued)

FOREIGN PATENT DOCUMENTS

| | | |
|---|---|---|
| JP | 2-106460 A | 4/1990 |
| JP | 5-012341 U | 2/1993 |

(Continued)

OTHER PUBLICATIONS

International Search Report (PCT/ISA/210) issued on Aug. 23, 2011, by the Japanese Patent Office as the International Searching Authority for International Application No. PCT/JP2011/061374.

(Continued)

*Primary Examiner* — Mary Cheung
*Assistant Examiner* — Michael Berns
(74) *Attorney, Agent, or Firm* — Buchanan Ingersoll & Rooney PC

(57) ABSTRACT

When the vehicle decelerates on the ascending slope, a required brake axle torque is calculated in accordance with vehicle deceleration, so that the swinging back is suppressed. At start timing after that, initial and final values of the required brake axle torque and a correction duration are determined. During the correction duration from the start timing, the required brake axle torque is decreased from the initial value to the final value. Then, based on change in a detected vehicular speed at or before a time which is a last moment of a period in which the detected vehicular speed detected based on detection signals of the wheel speed sensors are equal to or larger than a minimum detectable vehicular speed, a stop time at which an actual vehicle speed becomes zero is estimated, a period from the start time to the stop time is identified as the correction duration.

3 Claims, 7 Drawing Sheets

(51) Int. Cl.
  *B60W 10/18* (2012.01)
  *B60T 8/17* (2006.01)
  *B60T 7/12* (2006.01)
  *B60T 7/22* (2006.01)
  *B60W 30/18* (2012.01)

(56) References Cited

U.S. PATENT DOCUMENTS

| | | | | |
|---|---|---|---|---|
| 7,617,032 B2* | 11/2009 | Izawa et al. | ............... | 701/37 |
| 8,190,347 B2* | 5/2012 | Nakai et al. | ............... | 701/96 |
| 8,527,175 B2* | 9/2013 | Takeda et al. | ............... | 701/70 |
| 2009/0043466 A1* | 2/2009 | Nakai et al. | ............... | 701/55 |
| 2009/0043473 A1* | 2/2009 | Nakai et al. | ............... | 701/70 |
| 2009/0043474 A1 | 2/2009 | Nakai et al. | | |
| 2009/0125199 A1* | 5/2009 | Kaigawa | ............... | 701/54 |

FOREIGN PATENT DOCUMENTS

| | | |
|---|---|---|
| JP | 11-254995 A | 9/1999 |
| JP | 2008-094246 A | 4/2008 |
| JP | 2009-040305 A | 2/2009 |

OTHER PUBLICATIONS

Written Opinion (PCT/ISA/237) issued on Aug. 23, 2011, by the Japanese Patent Office as the International Searching Authority for International Application No. PCT/JP2011/061374.

* cited by examiner

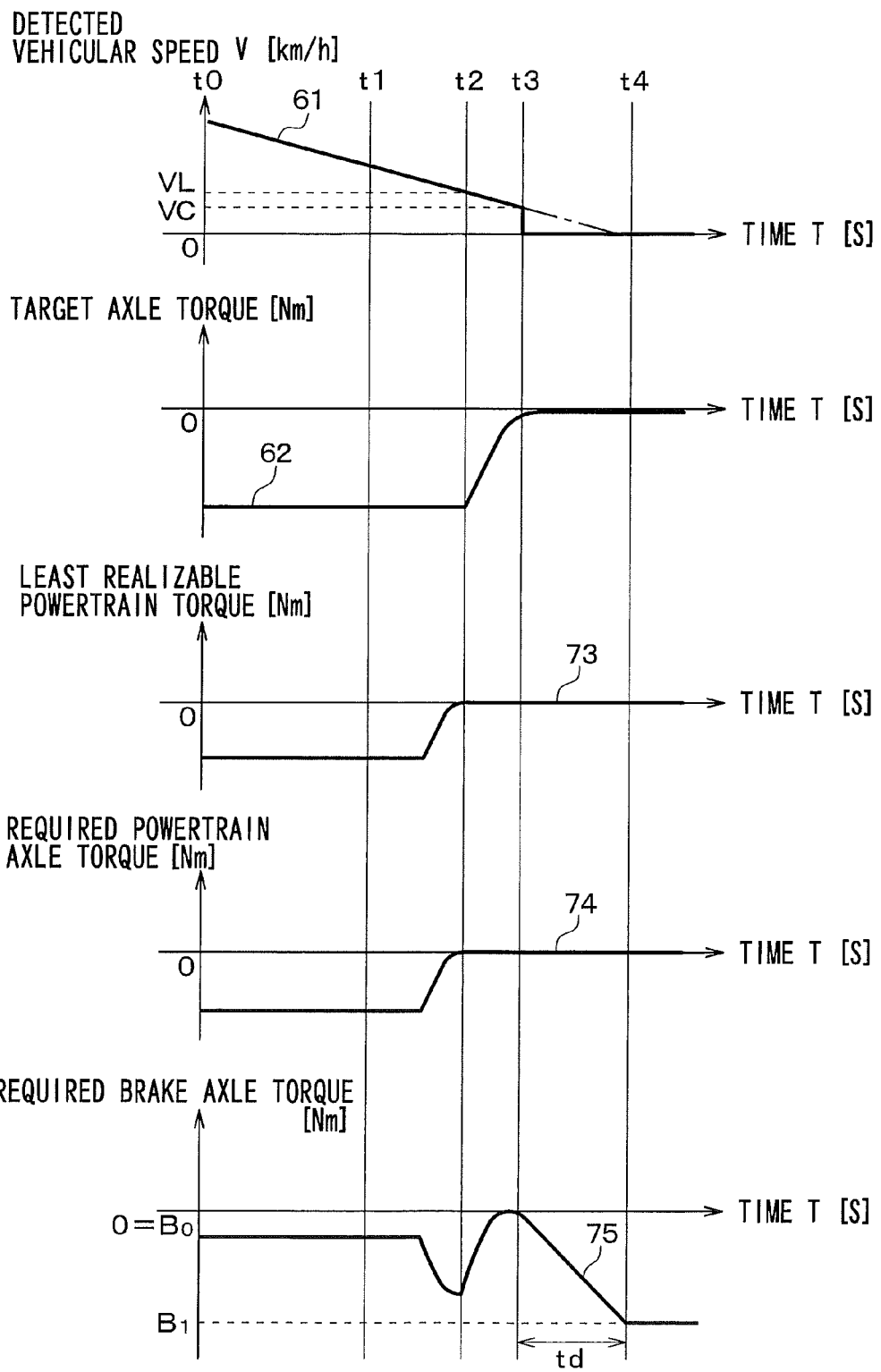

BRAKE CONTROL DEVICE

TECHNICAL FIELD

The present invention relates to a brake control device.

BACKGROUND ART

Conventionally, conformability of a passenger of a vehicle is harmed by nose diving and swinging back when the vehicle stops, wherein the nose diving is a phenomenon in which a front wheel end of a vehicle falls downward. To solve this problem, a control is performed in PTLs 1 and 2 in which deceleration of a vehicle is suppressed just before the vehicle stops.

Especially in PTL 2, in order to surely stop the vehicle while suppressing the deceleration when a vehicular speed is close to zero, a control is performed in which the deceleration of the vehicle is suppressed, subsequently maintained for a predetermined time, and after that, a brake force is increased to surely stop the vehicle.

CITATION LIST

Patent Literature

[PTL 1]
Japanese Patent Application Publication No. JP-A-H11-254995
[PTL 2]
Japanese Patent Application Publication No. JP-A-2009-40305

SUMMARY OF INVENTION

Technical Problem

However, even if such an art is used, it becomes highly possible that the vehicle goes back downward in stopping on an ascending slope depending on the gradient of the slope.

In view of this, we aim for reducing possibility that a vehicle goes back downward in an ascending slope in a control in which a swinging back of the vehicle is suppressed by suppressing deceleration of the vehicle just before the vehicle stops.

Solution to Problem

An invention described in a first aspect is a brake control device which is installed to a vehicle having a wheel speed sensor, calculates an axle torque (hereinafter referred to as a required brake axle torque) being an axle torque required to brake of the vehicle, and performs control for causing a brake device of the vehicle to generate a brake pressure corresponding to the required brake axle torque, wherein the brake control device; when the vehicle decelerates on an ascending slope, calculates, as the required brake axle torque, a required brake axle torque which comes closer to zero in accordance with deceleration of the vehicle; at a start timing after this operation, determines an initial value of the required brake axle torque, a final value which is farther apart from zero than the initial value is, and a correction duration, and causes the required brake axle torque to change from the initial value to the final value during the correction duration from the start timing, wherein the final value is a torque with which the vehicle can stop at the ascending slope; and with regard to the correction duration, based on change in a detected vehicular speed at or before a limit time which is a last moment of a period in which the detected vehicular speed of the vehicle detected based on a detection signal of the wheel speed sensor is equal to or larger than a minimum detectable vehicular speed, estimates a stop time at which an actual speed of the vehicle becomes zero, and identifies a period from the limit time to the stop time as the correction duration.

As is described above, when the vehicle decelerates on the ascending slope, the brake control device calculates a required brake axle torque which gets closer to zero in accordance with the deceleration of the vehicle. This suppresses the possibility of the nose diving and swinging back of the vehicle. At the start timing after that, the brake control device determines the initial value of the required brake axle torque, the final value which is farther apart from zero than the initial value is, and a correction duration, and decreases the required brake axle torque from the initial value to the final value during the correction duration from this start timing.

With regard to the correction duration, the brake control device estimates the stop time at which the actual speed of the vehicle becomes zero based on the change in the detected vehicular speed at or before the limit time which is a last moment of a period in which the detected vehicular speed of the vehicle is equal to or larger than the minimum detectable vehicular speed. Then the brake control device identifies a period from the start time to the stop time as the correction duration. The detected vehicular speed is an indicator directly expressing behavior of the vehicle and also a quantity subject to the influence of the gradient of the road. Therefore, by estimating the stop time based on this quantity, it is possible to perform adjustment control of the required brake axle torque in accordance with the steepness of the ascending slope in a manner that the correction duration td is shortened to quickly change the required brake axle torque when the ascending slope is steep, and in a manner that the correction duration is prolonged to slowly change the required brake axle torque when the ascending slope is mild. Therefore, it is possible to reduce possibility that the vehicle goes back downward in the ascending slope.

An invention described in a second aspect is the brake control device according to a first aspect, wherein the start timing is a timing at which the speed of the vehicle on the ascending slope becomes smaller than the minimum detectable vehicular speed. By choosing this timing as the start timing, it is possible to maximize the effect of suppressing of the nose diving and the swinging back and have sufficient time to perform control for preventing the vehicle from going back downward.

The timing at which the speed of the vehicle becomes smaller than the minimum detectable vehicular speed is a timing at which the required brake axle torque coming closer to zero in accordance with the deceleration of the vehicle comes closest to zero. In other words, this is a timing at which increase control of the required brake axle torque aimed for suppressing the nose diving and the swinging back ends. By choosing this timing as the start timing, it is possible to maximize the effect of suppressing of the nose diving and the swinging back and have sufficient time to perform control for preventing the vehicle from going back downward.

More specifically, as is described in a third aspect, a brake control device installed to a vehicle, comprising: a target acceleration setting portion for determining a target acceleration which the vehicle should achieve; and a braking/driving cooperative control portion for calculating, based on the target acceleration determined by the target acceleration setting portion, an axle torque (hereinafter referred to as a required powertrain axle torque) required to powertrain of the vehicle and an axle torque (hereinafter referred to as a required brake axle torque) required to brake of the vehicle, transmitting the calculated required powertrain axle torque to a powertrain axle torque realizing portion which performs control so that the powertrain of the vehicle generates the required powertrain axle torque, and transmitting the calculated required brake axle torque to a brake axle torque realizing portion which performs control so that a brake device of the vehicle generates a brake pressure corresponding to the required brake axle torque, wherein: the target acceleration setting portion calculates, when a speed of the vehicle on an ascending slope decreases to become equal to or smaller than a border vehicular speed, a negative soft acceleration which comes closer to zero in accordance with deceleration of the vehicle, identifies the calculated soft acceleration as the target acceleration, and keeps the soft acceleration constant after the vehicular speed becomes smaller than a minimum detectable vehicular speed of the wheel speed sensor; the braking/driving cooperative control portion determines, at a timing at which the speed of the vehicle on the ascending slope becomes smaller than a minimum detectable vehicular speed of the wheel speed sensor, a negative initial value of the required brake axle torque, a negative final value, and a correction duration, and causes the required brake axle torque to change from the initial value to the final value during the correction duration from the timing; the initial value is a required brake axle torque determined based on the target acceleration; the final value is a torque with which the vehicle can stop at the ascending slope; and the braking/driving cooperative control portion estimates a stop time at which an actual speed of the vehicle becomes zero based on a detected vehicular speed at a limit time and a detected acceleration a of the vehicle calculated by the detected vehicular speed, the limit time being a last moment of a period in which the detected vehicular speed of the vehicle detected based on a detection signal of the wheel speed sensor is equal to or larger than a minimum detectable vehicular speed, and the braking/driving cooperative control portion identifies a period from the limit time to the stop time as the correction duration.

Signs in parentheses in above or Claims indicate correspondence between terms written in Claims and concrete examples of the respective terms, wherein the examples are written in embodiments described later

BRIEF DESCRIPTION OF DRAWINGS

FIG. 9 is a timing chart showing a case example of another embodiment.

DESCRIPTION OF EMBODIMENTS

First Embodiment

Figure 1:
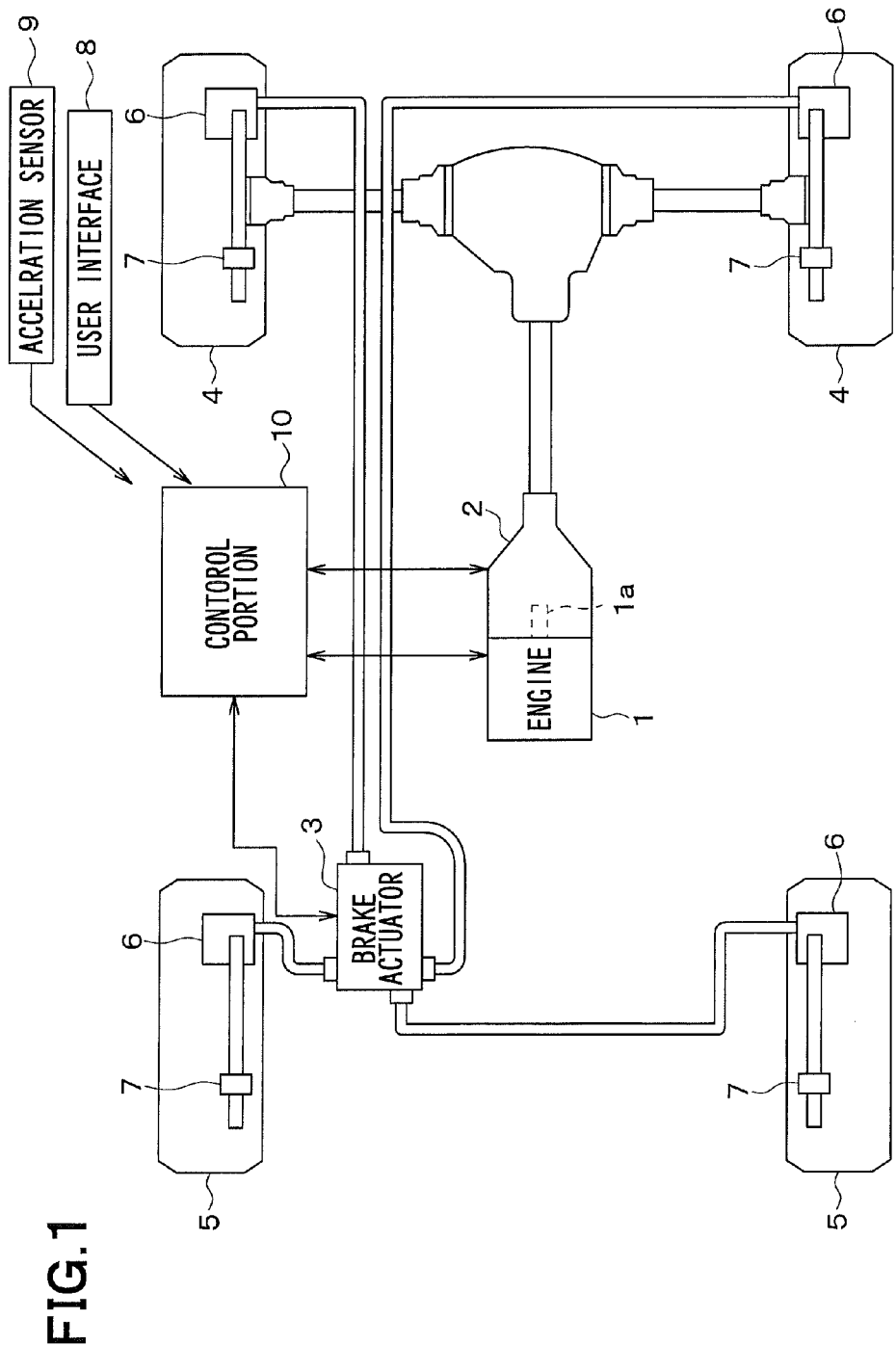
FIG. 1 is an overall configuration diagram of a vehicular braking/driving cooperative system according to an embodiment of the present invention.

Hereinafter, description is given of a vehicular braking/driving cooperative system according to an embodiment of the present invention. FIG. 1 shows an overall configuration of the vehicular braking/driving cooperative system. This vehicular braking/driving cooperative system includes an engine 1 serving as a gasoline-powered internal combustion engine, an automatic transmission 2, a brake actuator 3, wheel cylinders 6 respectively located in a vicinity of the wheels 4, 5, a wheel speed sensor 7 respectively located in a vicinity of the wheels 4, 5, a user interface 8, an acceleration sensor 9, and a control portion 10.

The well-known automatic transmission 2 is connected with a crank shaft 1a of the engine 1. Rotational power of the crank shaft 1 is conveyed, through gearshifting of the automatic transmission, to the drive wheels 4. An engine torque of the engine 1 and a gear ratio of the automatic transmission are controlled by the control portion 10.

It is possible to give the drive wheels 4 and the non-driven wheels 5 a braking force by means of a hydraulic driven brake actuator 3, wherein a non-driven wheel is a wheel which is not a drive wheel. The brake actuator 3 is a well-known device for adjusting, in accordance with control of the control portion 10, a pressure (a wheel cylinder pressure) of hydraulic fluid supplied to a wheel cylinder 6 of each of the wheels (the drive wheels 4 and the non-driven wheels 5). More specifically, the brake actuator 3 adjusts the wheel cylinder pressures so as to actualize request brake pressures Pmc received from the control portion 10.

A wheel speed sensor 7 is further installed to each of the drive wheels 4 and the non-driven wheels 5 to wherein each wheel speed sensor 7 detects a rotational speed of a corresponding wheel. In addition, a user interface 8 and an acceleration sensor 9 are installed to the vehicle.

The wheel speed sensors 7 output detection signals corresponding respectively to the rotational speeds of the wheels 4, 5. For example, each of the wheel speed sensors 7 may be constructed in which a sensor body is located in a vicinity of and face to face with an outer peripheral surface of a gear-shaped magnetic rotor which is located so as to rotate in synchronization with a corresponding wheel 4, 5 and may output a detection signal indicative of induced electromotive force which is generated by rotation of the rotor relative to the sensor body. In this case, the frequency of the detection signal is proportional to a rotational speed of the rotor, that is, the rotational speed of a corresponding wheel.

The control portion 10 (more specifically, a powertrain axle torque realizing portion of a powertrain ECU 12, a brake axle torque realizing portion of a brake ECU 13, a target acceleration setting portion 144 of a drive support ECU 14, and a braking/driving cooperative control portion of the drive support ECU 14, which are described later) receiving this detection signal from each of the wheel speed sensors 7 calculates a speed of the vehicle based on the received detection signals. For example, the control portion 10 uses an average of the speed of the wheels 4, 5 as the speed of the vehicle. The speed of the vehicle in such a way is hereinafter referred to as a detected vehicle speed.

In this case, there is a lowermost limit (for example, 0.16 m/s) in the speed of the vehicle which the control portion 10 can detect based on the detection signals. When an actual speed of the vehicle (hereinafter referred to as an actual vehicle speed) becomes smaller than the lower limit, the detected vehicle speed becomes zero. Hereinafter, the lowermost detection limit of the vehicular speed which can be detected by the detection signals from the wheel speed sensors 7 is referred to as a minimum detectable vehicular speed Vc.

A user interface 8 includes an automatic driving requesting switch which a user uses in requesting automatic driving of the vehicle, an acceleration operation member which a user uses in requesting increase of torque of the engine 1, and a brake operation member which a user uses in indicating a braking force of each of wheel cylinder 6.

The acceleration sensor 9 is a sensor for detecting an acceleration based on a force (an inertial force associated with acceleration of the vehicle) applied to the acceleration sensor 9. However, it is inherent in the nature of this acceleration sensor 9 that this acceleration sensor 9 detects a gravitational force applied thereto. The acceleration sensor 9 may be of a pendulous type or a strain gauge type.

The control portion 10 controls a state of travel (braking and driving) of the vehicle wherein the vehicle serves as a target of control. More specifically, the control portion 10 receives detection signals from various types of sensors detecting an operation state of the engine 1 and a manipulation state of the automatic transmission 2, obtains an output signal of the user interface 8 and the detection signals from the wheel speed sensors 7 and the acceleration sensor 9, and performs braking and/or driving control of the vehicle based on these signals. In addition, the control portion 10 performs a control so that the vehicle travels at a target acceleration when a request for automatic driving is inputted from a user by means of the user interface 8.

Figure 2:
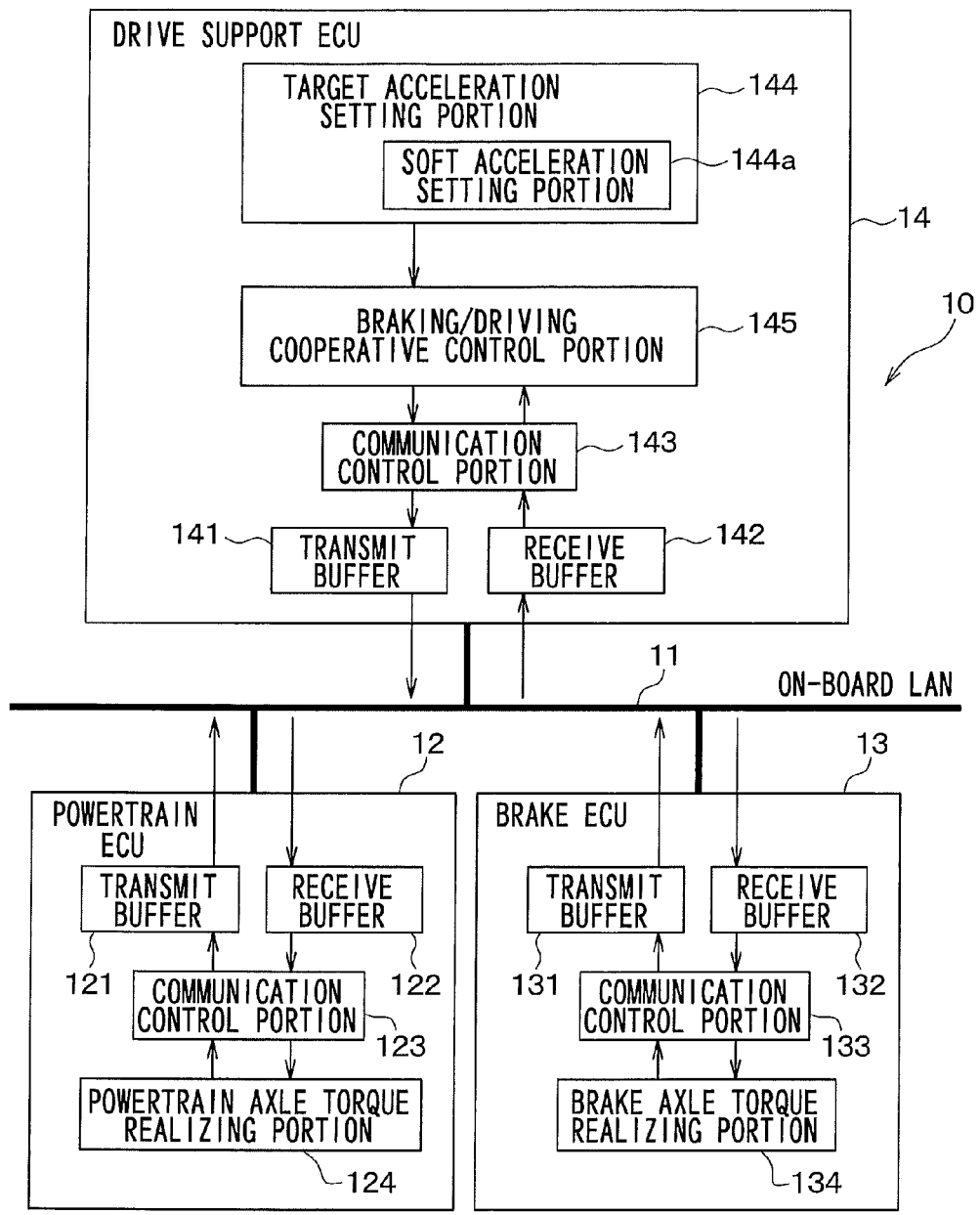
FIG. 2 is a configuration diagram of a control portion 10.

FIG. 2 shows a configuration of the control portion 10. The control portion 10 includes an on-board LAN 11 (such as CAN, LIN, and the like), and also includes the powertrain ECU 12, the brake ECU 13 and the drive support ECU 14 which can communicate with each other through the on-board LAN 11.

The powertrain ECU 12 includes a transmit buffer 121, a receive buffer 122, and a communication control portion 123 which are well known and for communicating with the drive support ECU 14 and the like through the on-board LAN 11. The powertrain ECU 12 also includes a powertrain axle torque realizing portion 124.

A well-known microcontroller can be used as the powertrain axle torque realizing portion 124 which receives a required powertrain axle torque (which is an axle torque required to the powertrain) and outputs a request value (a request engine torque Te) of a torque for the engine 1 and a request value of a gear ratio for the automatic transmission 2 (a request gear ratio Gr) based on the received required powertrain axle torque. The engine torque of the engine 1 and the gear ratio of the automatic transmission 2 are determined in accordance with the request engine torque Te and the request gear ratio Gr. With this operation, the powertrain torque realizing portion 124 performs control so that the powertrain (a power transmission drive system including the engine 1 and the automatic transmission 2) of the vehicle generates an axle torque which is the same as the above-described required powertrain axle torque.

The brake ECU 13 includes a transmit buffer 131, a receive buffer 132, and a communication control portion 133 which are well known and for communicating with the drive support ECU 14 and the like through the on-board LAN 11. The brake ECU 13 also includes a brake axle torque realizing portion 134.

A well-known microcontroller can be used as the brake axle torque realizing portion 134 which receives a required brake axle torque (which is an axle torque required to the brake) from the drive support ECU 14 through the on-board LAN 11 and outputs request values (request brake torques Pmc) of the wheel cylinder pressures (brake pressures) to the brake actuator 3 based on the received required brake axle torque. The brake actuator 3 operates so that the wheel cylinder pressures of the wheel cylinders 6 becomes the same as the received request brake torques Pmc, respectively. With this operation, the brake torque realizing portion 134 performs control so that the brake device (the brake actuator 3 and the wheel cylinders 6) generates the brake pressures corresponding to the above-described required brake axle torque. More specifically, higher brake pressures are generated as the required brake axle torque having a negative value gets farther from zero (that is, as the absolute value of the required brake axle torque having a negative value gets larger).

The drive support ECU 14 (which corresponds to an example of a brake control device) includes a transmit buffer 141, a receive buffer 142, and a communication control portion 143 which are well known and for communicating with the powertrain ECU 12 and the brake ECU 13 and the like through the on-board LAN 11. The drive support ECU 14 also includes a target acceleration setting portion 144 and a braking/driving cooperative control portion 145.

A single microcontroller can be used for each one of the target acceleration setting portion 144 and the braking/driving cooperative control portion 145. Otherwise, a single microcontroller may serve as an integrated unit of the target acceleration setting portion 144 and the braking/driving cooperative control portion 145.

At every predetermined control cycle, the target acceleration setting portion 144 determines an acceleration (i.e. a target acceleration) which the vehicle should achieve and outputs the determined target acceleration to the braking/driving cooperative control portion 145. As a method for determining the target acceleration, an exemplary method described below can be used.

In the case that a user has requested the automatic driving of the vehicle to the automatic driving requesting switch of the user interface 8, the target acceleration setting portion 144 determines the target acceleration by executing various applications for the automatic driving.

These various applications for the automatic driving include, for example, a cruise control, an inter-vehicular distance control, and a precrash control. The cruise control keeps the speed of the vehicle at a constant speed. The inter-vehicular distance control keeps a distance between the vehicle and another vehicle in front. The precrash control decelerates the vehicle in order to suppress shock of impact with another vehicle in front.

In the case that the plurality of applications are executed for the automatic driving, the target acceleration setting portion 144 executes an arbitration control. In the arbitration control, the target acceleration setting portion 144 determines a single target acceleration based on target accelerations which are determined respectively by these cruise controls, the inter-vehicle control and the precrash control, and outputs the single target acceleration to the braking/driving cooperative control portion 145.

At every predetermined control cycle, the braking/driving cooperative control portion 145 executes two degrees of freedom control having a feedforward control and a feedback control to calculate the above-described required powertrain axle torque and the above-described required brake axle torque based on the target acceleration received from the target acceleration setting portion 144, transmits the calculated required powertrain axle torque to the powertrain ECU 12 through the on-board LAN 11, and transmits the calculated required brake axle torque to the brake ECU 13 through the on-board LAN 11.

Figure 3:
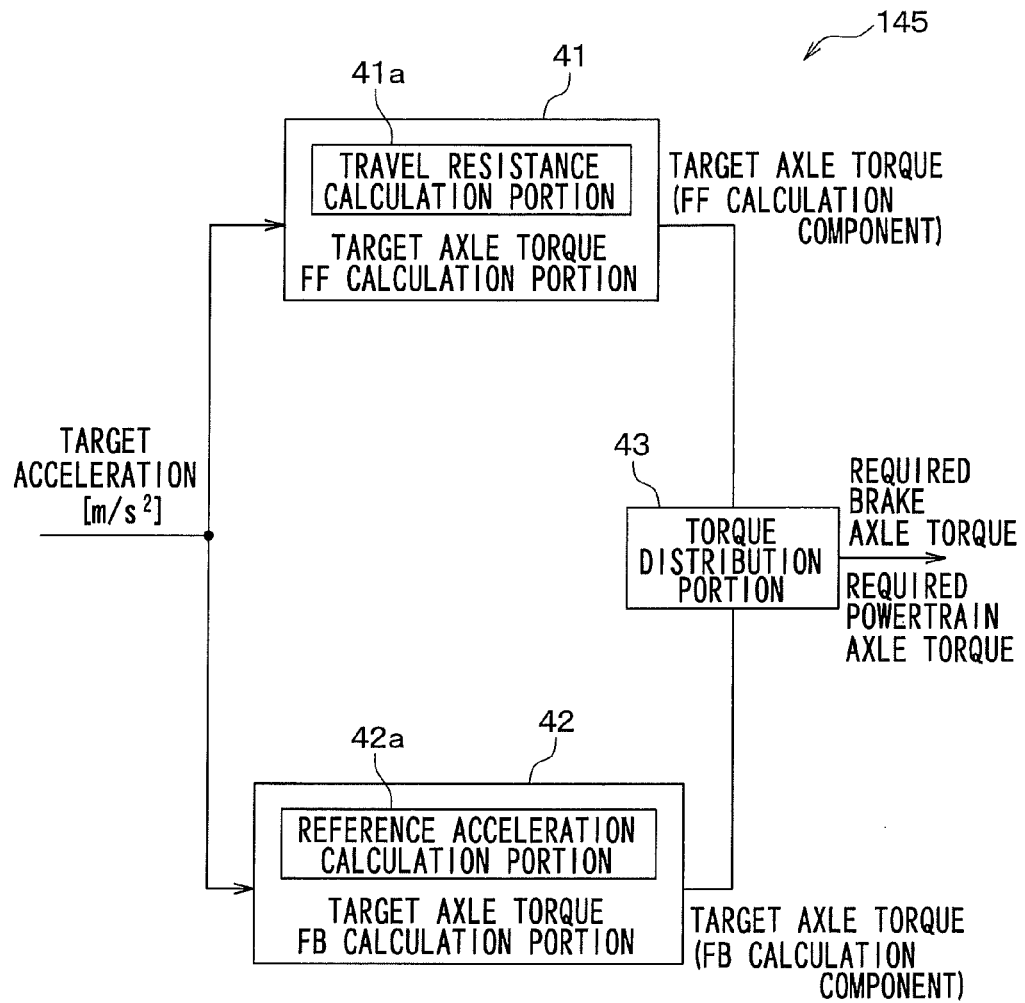
FIG. 3 is a functional configuration diagram of a braking/driving cooperative control portion 145.
Figure 4:
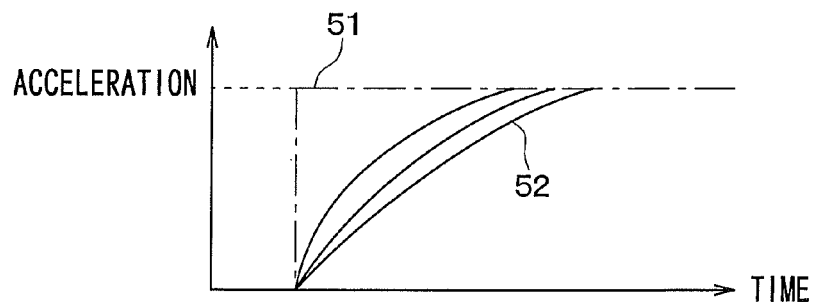
FIG. 4 is a graph showing a relation between a target acceleration 51 and a reference acceleration 52.

FIG. 3 shows acceleration functional configuration of the braking/driving cooperative control portion 145, the functions of the braking/driving cooperative control portion 145 are divided into a target axle torque FF calculation portion 41, a target axle torque FB calculation portion 42, and a torque distribution portion 43.

The target axle torque FF calculation portion 41, the target axle torque FB calculation portion 42, and the torque distribution portion 43 can be respectively attained respectively by three programs which are executed in a parallel manner at the same time. Otherwise, these three portions 41 to 43 may be attained respectively by three ICs in the braking/driving cooperative control portion 145.

The target axle torque FF calculation portion 41 and the target axle torque FB calculation portion 42 are portions respectively for performing feedforward calculations and feedback calculations so that the target acceleration is actualized. The target axle torque FF calculation portion 41 calculates an FF (feedforward) calculation component of the target axle torque, and the target axle torque FB calculation portion 42 calculates an FB (feedback) calculation component of the target axle torque. The torque distribution portion 43 identifies a sum of the FF component and the FB component of the target axle torque as the target axle torque and distributes this target axle torque to the required powertrain axle torque and the required brake axle torque.

First, the target axle torque FF calculation portion 41 is described in detail. The target axle torque FF calculation portion 41 includes a travel resistance calculation portion 41$a$ for calculation travel resistance of the vehicle, calculates a force Fff which is a sum of the calculated travel resistance and a reference force (which is obtained by multiplying the target acceleration by a preset weight M of the vehicle), and identifies a result of multiplying the calculated force Fff by a radius r of the drive wheels 4 (which is predetermined) as the FF calculation component of the target axle torque. In other words, the FF calculation component of the target axle torque is equal to an axle torque which is necessary to actualize the target acceleration of the vehicle against the travel resistance.

The travel resistance calculated by the travel resistance calculation portion 41$a$ is a force in a longitudinal direction to the rear of the vehicle caused by, for example, three types of resistances including air resistance, rolling resistance, resistance of gravitation. The air resistance is a force which air applies to the vehicle in the direction opposite to the traveling direction of the vehicle when the vehicle is traveling. The air resistance is calculated based on, for example, the square of the detected vehicular speed V, density $\rho$ of the air, a coefficient Cd, and a frontal projected area S of the vehicle. The rolling resistance is a resistance force generated by friction between road surface and an entire set of drive wheels 4 and the non-driven wheels 5. The rolling resistance is calculated by a rolling friction coefficient $\mu$, the weight of the vehicle M, gravitational acceleration g, and gradient $\theta$ of road surface. The resistance of the gravitation is a gravitational force applied in the direction opposite to the traveling direction of the vehicle when the road surface is inclined. This is a quantity which can be expressed by $M \cdot g \cdot \sin \theta$ by using the gradient $\theta$ of the road surface. The gradient $\theta$ of the road surface can be calculated based on the detection signal of the acceleration sensor 9 and the detected vehicular speed V obtained by the detection signals of the wheel speed sensors 7. The gradient $\theta$ of the road surface becomes zero when the road surface is horizontal in the traveling direction of the vehicle, becomes larger than zero when the road surface is ascending in the traveling direction of the vehicle, and becomes smaller than zero when the road surface is descending in the traveling direction of the vehicle.

When the detected vehicular speed V becomes smaller than the minimum detectable vehicular speed Vc, the latest calculated gradient $\theta$ within a past period in which the detected vehicular speed V was equal to or larger than the minimum detectable vehicular speed Vc may be kept using until the detected vehicular speed V becomes larger than the minimum detectable vehicular speed Vc again or it is determined that the vehicle has completely stopped. It is possible to determine whether the vehicle has completely stopped by using change in the detected value of the acceleration sensor or elapsed time since the detected vehicular speed V becomes smaller than the minimum detectable vehicular speed Vc.

Next, the target axle torque FB calculation portion 42 is described in detail. The target axle torque FB calculation portion 42 includes a reference acceleration calculation portion 42$a$. This reference acceleration calculation portion 42$a$ transforms the target acceleration by means of a well-known reference model to obtain the reference acceleration.

The target axle torque FB calculation portion 42 calculates the FB calculation component of the target axle torque by means of feedback calculations based on the reference acceleration calculated by the reference acceleration calculation portion 42$a$ and the detected vehicular speed.

More specifically, the target axle torque FB calculation portion 42 calculates a time derivative (i.e. a detected acceleration) of the detected vehicular speed V based on the detection signals of the wheel speed sensors 7 and removes high frequency components (noise components) from the detected acceleration by applying a low-pass filtering process to the detected acceleration. The resulting detected acceleration from which these noise components have been removed is identified as a first input.

The same low-pass filtering process is also applied to the reference acceleration calculated by the reference acceleration calculation portion 42$a$, and the resulting reference acceleration is identified as a second input.

The target axle torque FB calculation portion 42 further calculates a difference (a difference err) indicating how much the second input differs from the first input. This difference is a value at a past time which is earlier than the present time by time delay caused by the low-pass filtering process with respect to difference indicating how much the detected acceleration differs from the reference acceleration.

The target axle torque FB calculation portion 42 further performs a feedback control in which the first input is fed back to the second input. More specifically, in the present embodiment, a well-known PI control is performed. To be more specific, a value of integral Ierr is calculated based on the difference err. To be more precise, a present value of integral Ierr is obtained by adding to the previous value of integral Ierr0 a value obtained by multiplying a present value of the difference err by the control cycle td of the braking/driving cooperative control portion 145. Subsequently, the FB calculation component of the target axle torque is calculated. More specifically, the FB calculation component of the target axle torque is calculated as a sum of two values wherein one of the two values is obtained by multiplying the difference err by a proportional gain Kp, and another one of the two values is obtained by multiplying the value of integral Ierr by a proportional gain Ki. In other words, the FB calculation component of the target axle torque is a torque requested so that the detected acceleration becomes the same as the reference acceleration. After calculating the FB calculation component of the target axle torque, the target axle torque FB calculation portion 42 stores the present difference err as the previous difference err0 and stores the present value of integral Ierr as the previous value of integral Ierr0.

Next, the torque distribution portion 43 is described in detail. The torque distribution portion 43 calculates the target axle torque so that it becomes equal to the sum of the FF calculation component of the target axle torque and calculated by the target axle torque FF calculation portion 41 and the FB calculation component of the target axle torque and calculated by the target axle torque FB calculation portion 42.

Then the torque distribution portion 43 divides (distributes) the target axle torque into the required powertrain axle torque and the required brake axle torque. More specifically, the torque distribution portion 43 determines whether or not the target axle torque is equal to or larger than a least realizable powertrain torque Tptmin. This process determines whether it is possible to generate the target axle torque only by means of the powertrain. Here, the least realizable powertrain torque Tptmin is the smallest torque realizable by the engine 1 and the automatic transmission 2.

If the target axle torque is equal to or larger than the least realizable powertrain torque Tptmin, the torque distribution portion 43 determines it is possible to generate the target axle torque only by means of the powertrain and assigns the target axle torque to the required powertrain axle torque while assigning zero to the required brake axle torque.

In contrast, when the target axle torque is equal to or smaller than the least realizable powertrain torque Tptmin, the torque distribution portion 43 determines it is not possible to generate the target axle torque only by means of the powertrain, and assigns the least realizable powertrain torque Tptmin to the required powertrain axle torque while calculating the required brake axle torque so that the required brake axle torque becomes equal to the result of subtracting the least realizable powertrain torque Tptmin from the target axle torque.

The required powertrain axle torque and the required brake axle torque which are thus calculated are transmitted respectively to the powertrain ECU 12 and the brake ECU 13 by using the communication control portion 143. The torque distribution portion 43 in FIG. 3 is an example of means for causing the brake device 3, 6 of the vehicle to generate a brake pressure corresponding to the calculated required brake axle torque. This function is illustrated by the arrow starting from the torque distribution portion 43 in FIG. 3.

In addition to the operation of the control portion 10, the drive support ECU 14 of the present embodiment performs the following operation.

First, the target acceleration setting portion 144 performs a soft stop control in order to suppress shock caused by nose diving and swinging back in stopping the vehicle. In the soft stop control, the portion 144 calculates a soft acceleration and outputs, if need arises, the calculated soft acceleration as the target acceleration to the braking/driving cooperative control portion 145.

More specifically, the target acceleration setting portion 144 calculates the sort acceleration and identifies the calculated soft acceleration as the target acceleration when the detected vehicular speed is equal to or smaller than a border vehicular speed VL (which is a positive value). The border vehicular speed VL becomes smaller as a detected deceleration of the vehicle becomes smaller (that is, as the absolute value of the detected deceleration becomes smaller wherein the detected deceleration is the result of sign inversion of the acceleration of the vehicle). This operation is aimed for surely suppressing the deceleration at the last moment of stopping of the vehicle without prolonging a time period until the vehicle completely stops. More specifically, a time period until the speed of the vehicle becomes zero gets longer as the deceleration becomes smaller (that is, as the absolute value of the deceleration becomes smaller wherein the detected deceleration is the result of sign inversion of the acceleration). Therefore, the time period until the vehicle actually stops would get excessively long if the operation were early switched to the control with the soft acceleration when the deceleration were small. In contrast, the time period until the speed of the vehicle becomes zero gets shorter as the deceleration becomes larger. Therefore, the vehicle would stop with excessively large deceleration which causes intense shock at the vehicle if the operation were late for switching to the control with the soft acceleration when the deceleration were large. However, it is possible to surely suppress the deceleration at the last moment of stopping and favorably suppress shock at the vehicle by transiting to the control with the soft acceleration at a smaller vehicular speed as the detected deceleration is smaller (that is, as the absolute value of the detected deceleration becomes smaller wherein the detected deceleration is the result of sign inversion of the acceleration of the vehicle).

Figure 5:
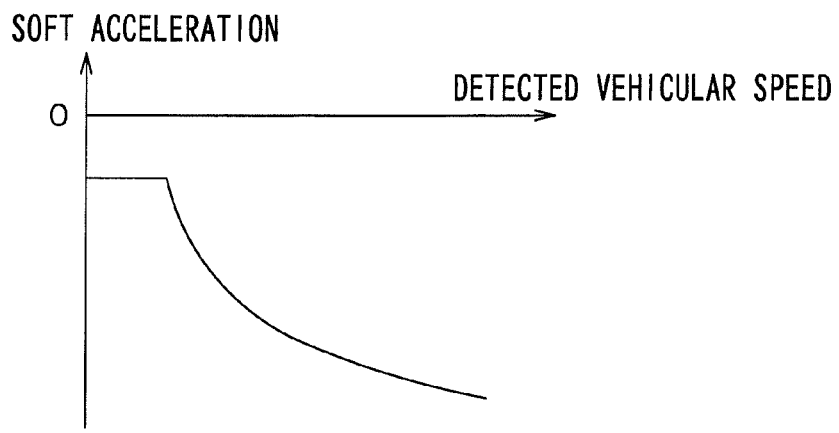
FIG. 5 is a diagram showing a map for calculating a soft acceleration.

Calculation of the soft acceleration is performed by a soft acceleration setting portion 144a (see FIG. 2) which is included by the target acceleration setting portion 144. This soft acceleration setting portion 144a calculates the soft acceleration based on a map corresponding to the current detected vehicular speed. FIG. 5 shows an example of the map. In this map, the soft acceleration has a negative value (i.e. a value indicating that the vehicle is decelerating), and the absolute value of the soft acceleration (i.e. a deceleration) is set to become smaller as the detected vehicular velocity becomes smaller. The soft acceleration is smaller than zero even if the detected vehicular speed is zero. This operation is aimed for surely stopping the vehicle because there is a case in which the vehicle has not completely stopped even if the detected vehicular speed is zero. The value of the soft acceleration is changed based on resolution capability of the wheel speed sensors.

When the vehicle is traveling on an ascending slope, the torque distribution portion 43 corrects as necessary the required brake axle torque calculated as is described above in order to reduce possibility that the above soft stop control causes the vehicle to go back downward the ascending slope. Hereinafter, this correction is described in detail.

Figure 6:
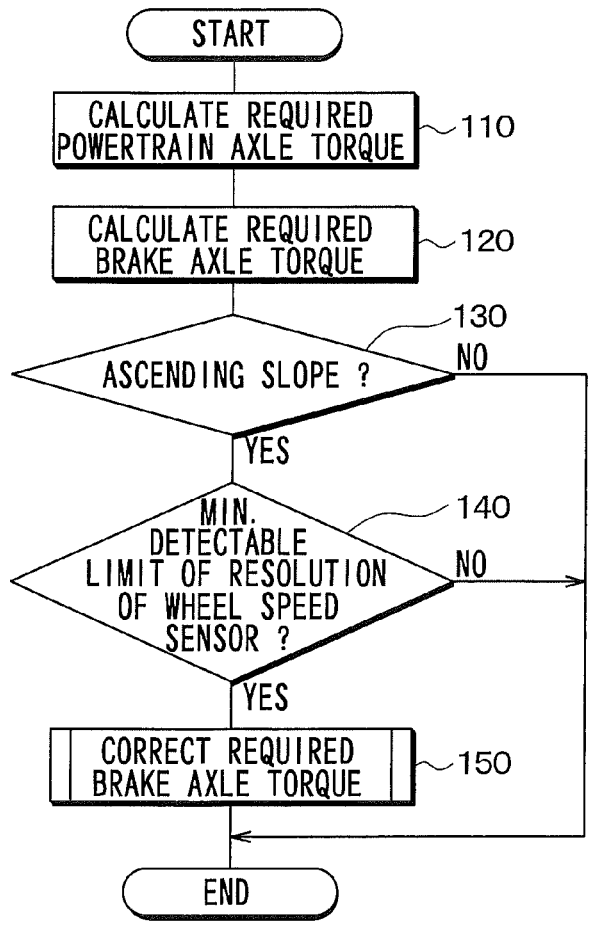
FIG. 6 is a torque distribution portion.

The torque distribution portion 43 executes the processes shown in FIG. 6 once every control cycle. The processes shown in FIG. 6 as performed by the torque distribution portion 43 represent an example of means for calculating a required brake axle torque which is an axle torque required to brake the vehicle. The portion 43 calculates at step 110 the required powertrain axle torque as is described above, then calculates at step 120 the required brake axle torque as is described above, and determines whether the vehicle is on an ascending slope based on the gradient θ of the road surface calculated by the travel resistance calculation portion 41a. The torque distribution portion 43 thus represents an example of means for calculating the required brake axle torque so that it comes closer to zero in accordance with deceleration of the vehicle when the vehicle decelerates on an ascending slope.

When it is determined that the vehicle is not on an ascending slope, the portion 43 terminates the processes in FIG. 6 without correcting the required brake axle torque. However, when it is determined that the vehicle is on an ascending slope, the portion 43 determines at step 140 whether the actual vehicular velocity is smaller than the minimum detectable limit defined by the resolution capability of the wheel speed sensors, that is, whether the detected vehicular velocity is zero. If the actual vehicular velocity is smaller than the minimum detectable limit defined by the resolution capability of the wheel speed sensors, the portion 43 corrects at step 150 the required brake axle torque. If the actual vehicular velocity is not smaller than the minimum detectable limit defined by the resolution capability of the wheel speed sensors, the portion 43 terminates the processes in FIG. 6 without correcting the required brake axle torque.

Figure 7:
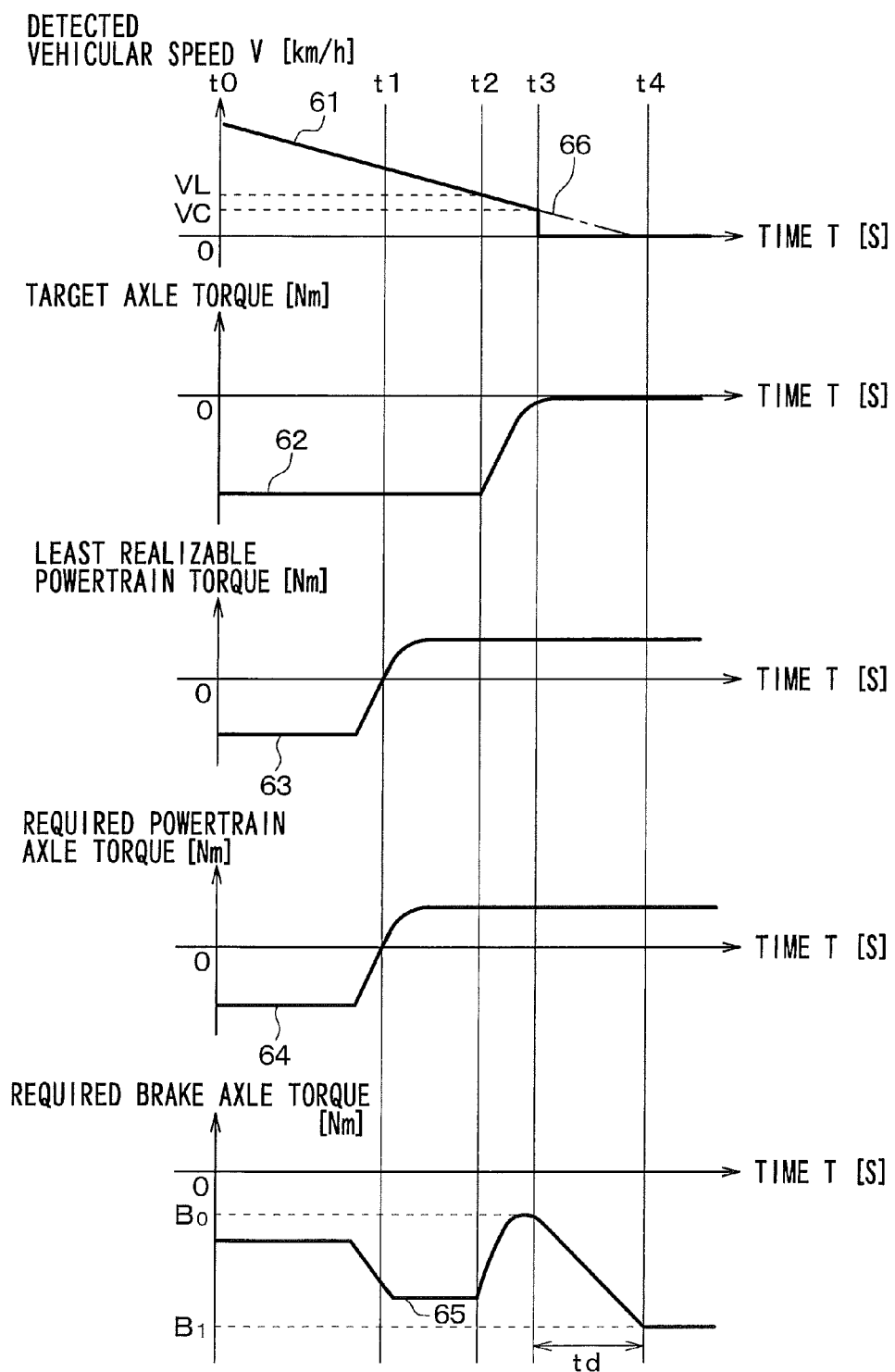
FIG. 7 is a timing chart showing a case example of a present embodiment.

FIG. 7 shows timing charts of various quantities in an example in which the soft stop control at the soft acceleration setting portion 144a and the correction of the torque distribution portion 43 are performed. In this example, the vehicle decelerates on an ascending slope and stops.

Hereinafter, control of the control portion 10 and operation of the vehicular breaking/driving cooperative system are described along with this example. First, from a time t0 to a time t2, the target axle torque 62 is kept constant at a negative value because of reasons one of which is that the target acceleration has a negative value so as to decelerate and stop the vehicle. As a result of the target axle torque 62 being constant at the negative value, the detected vehicular speed 61 is being decreased from the time t0 to the time t2. At this stage, since the detected vehicular speed 61 is still larger than the border vehicular speed VL and is therefore not zero, the soft stop control of the soft acceleration setting portion 144a is not executed and the correction of the torque distribution portion 43 is not executed because, in the processes in FIG. 6, the determination at step 130 becomes affirmative and the determination at subsequent step 140 becomes negative.

In addition, around a time t1 which is between the times t0 and t2, the least realizable powertrain torque 63 changes from negative to positive. This is because the engine 1 and the automatic transmission 2 switch, around the time t1, their operation from one serving as an engine brake to another one generating a creep force, wherein the creep force is a force causing the vehicle to move forward while the axel pedal is not pressed by the driver.

In the example shown in FIG. 7, during the period from time t0 to the time t2, the least realizable powertrain torque 63 cannot achieve the target axle torque 62 alone. Therefore, the torque distribution portion 43 sets the value of the required powertrain axle torque 64 so that it becomes the same as the least realizable powertrain torque 63. In addition, the portion 43 sets the value of the required brake axle torque so that it becomes the same as the result of subtracting the required powertrain axle torque 64 from the target axle torque 62. Therefore, when the least realizable powertrain torque 63 increases through the time t1, the required brake axle torque 65 decreases to compensate for the increase of the least realizable powertrain torque 63.

Subsequently at the time t2, the detected vehicular speed 61 becomes the border vehicular speed VL. Then, the soft acceleration setting portion 144a of the target acceleration setting portion 144 starts a soft stop control. The target acceleration accordingly becomes the soft acceleration corresponding to the detected vehicular speed 61 in the map shown in FIG. 5.

Since the soft acceleration has a negative value, the detected vehicular speed 61 keeps decreasing after the time t2. Along with the decrease of the detected vehicular speed 61, the target acceleration (i.e. the soft acceleration) increases and gets close to zero. As a result, the target axle torque 62 and the required brake axle torque 65 which the torque distribution portion 43 calculates increase and get close to zero along with decrease of the detected vehicular speed 61. This decreases wheel cylinder pressures generated at the wheel cylinders 6. Since the detected vehicular speed 61 is larger than the minimum detectable vehicular speed Vc before the time t3, the correction is not performed at the processes of the torque distribution portion 43 in FIG. 6 because, even if the determination at step 130 is affirmative, the determination at subsequent step 140 is negative.

At a time t3, the detected vehicular speed 61 comes down to the minimum detectable vehicular speed Vc. At the next time, the actual vehicular speed 66 becomes smaller than the minimum detectable vehicular speed Vc and the detected vehicular speed becomes zero. Starting from this time, the soft acceleration is kept constant because the detected vehicular speed 61 is kept being zero. Correspondingly, the increase of the required brake axle torque 65 (i.e. depressurization of the wheel cylinder pressure) stops.

Figure 8:
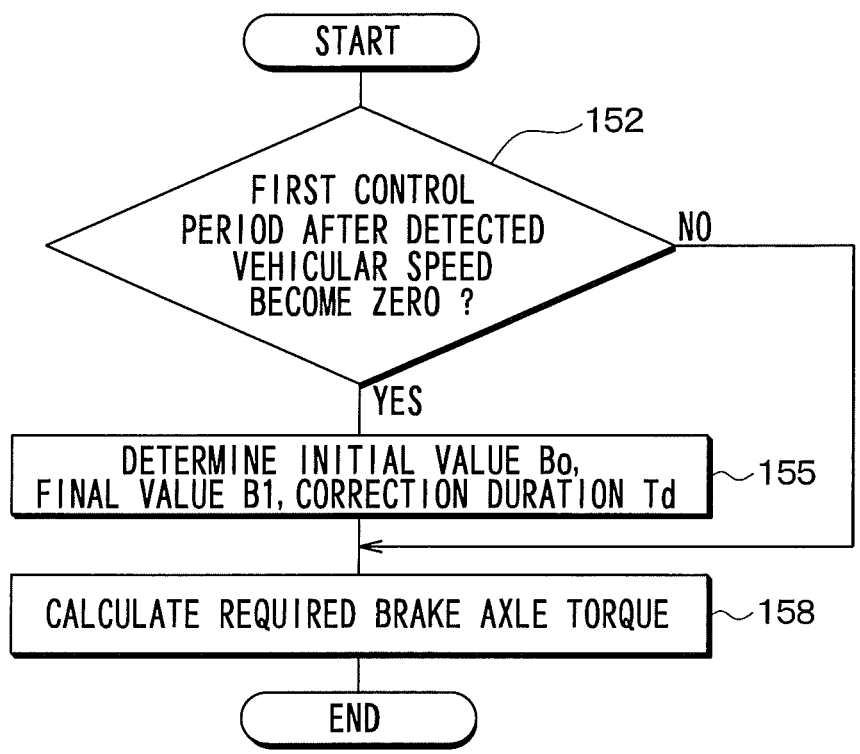
FIG. 8 is a flow chart showing a required brake axle torque correction process.

After the time t3 (which corresponds to an example of a start timing), the torque distribution portion 43 determines at step 140 that the actual vehicular velocity is smaller than the minimum detectable limit defined by the resolution capability of the wheel speed sensors and executes at step 150 a correction process of the required brake axle torque 65. FIG. 8 shows details of the correction process of the required brake axle torque 65.

In this correction process, the torque distribution portion 43 determines at step 152 whether the current time is in the first control cycle after the detected vehicular speed 61 becomes zero. If the current time is in the first control cycle, the portion 43 sets at step 155 an initial value B0 and a final value B1 of the required brake axle torque 65, and a correction duration td. Both of the initial value B0 and the final value B1 have a negative value, and the final value B1 is smaller than the initial value B0. The torque distribution portion 43 performing processes such as shown in FIG. 8 represents an example of means for determining, at a start timing after operation of the processes shown in FIG. 6, an initial value of the required brake axle torque, a final value farther from zero than the initial value, and a correction duration, and for causing the required brake axle torque to change from the initial value to the final value during the correction duration from the start timing.

The initial value B0 of the required brake axle torque 65 only have to have a value which is close to the required brake axle torque 65 calculated at step 120 in the previous control cycle. For example, the initial value B0 is a value which is the same as the required brake axle torque 65 calculated at step 120 in the present control cycle. The absolute value of the final value B1 is the sum of a constant value C (which corresponds to a margin) and a slope correction term S. The slope correction term S is a torque generating a force for resisting a gravitational force applied to the vehicle in the longitudinal direction to the rear of the vehicle.

With regard to the correction duration td, the portion 43 estimates a stop time at which the actual speed of the vehicle is expected to become zero based on the minimum detectable vehicular speed Vc and the detected acceleration a at the limit time t3 which is the last moment of a period in which the detected vehicular speed is larger than the speed Vc. Then the portion 43 identifies a period from the limit time t3 to the stop time as the correction duration td. The correction duration td may be simply calculated by means of an equation td=|Vc/a|. Otherwise, the correction duration td may be calculated more precisely by using change of the required brake axle torque 65 from the time t3 to the time t4. The detected acceleration a used here has a negative value because the vehicle is decelerating. In addition, the detected acceleration a tends to becomes smaller (that is, the absolute value of the detected acceleration a tends to becomes larger) as the gradient θ of road surface becomes larger. Therefore, the correction duration td generally becomes smaller as the gradient θ of road surface becomes larger. This is because the brake pressures should be increased more quickly as the ascending slope becomes steeper in view of the fact that the vehicle stops more quickly as the ascending slope becomes steeper.

In the case that the current time is determined at step 152 that it is not in the first control cycle, or after step 155, the portion 43 calculates at step 158 the required brake axle torque 65 at the present time (at the time after correction). More specifically, in the case that Tc is the control cycle and N is the number indicating how many times step 158 is executed after the detected vehicular speed becomes zero, the value obtained by an equation B0+(B1−B0)·N·Tc/Td is identified as the required brake axle torque 65 at the present time. Therefore, the required brake axle torque 65 is determined by means of linear interpolation on the condition that required brake axle torque 65 becomes the initial value B0 at the time t3 and the final value B1 at the time t4.

With this operation, the actual vehicular speed 66 of the vehicle denoted by an alternate long and short dash line decreases to zero in the period from the time t3 to the time t4. Since the absolute value of the required brake axle torque 65 increases in this time period, it is possible to obtain sufficient brake pressures in stopping the vehicle. As a result it is possible to reduce possibility that the vehicle goes back downward the ascending slope.

It should be noted that switching control is performed in which the feedback calculations are stopped in order to prevent this correction at the torque distribution portion 43 and the feedback calculations from canceling out each other.

As is described above, when the vehicle decelerates on the ascending slope, the drive support ECU 14 calculates a required brake axle torque having the negative value which gets closer to zero in accordance with the deceleration of the vehicle. This suppresses the possibility of the nose diving and swinging back of the vehicle. At the start timing after that, the drive support ECU 14 determines the negative initial value B0 of the required brake axle torque, the negative final value B1 of the required brake axle torque, and the correction duration td, and decreases the required brake axle torque from the initial value B0 to the final value B1 during the correction duration from this start timing t3.

With regard to the correction duration td, the drive support ECU 14 estimates the stop time t4 at which the actual speed of the vehicle becomes zero based on the change in the detected vehicular speed at or before the limit time t3 which is the last moment of a period in which the detected vehicular speed of the vehicle is equal to or larger than the minimum detectable vehicular speed Vc. Then the ECU 14 identifies a period from the limit time t3 to the stop time t4 as the correction duration td. The detected vehicular speed is an indicator directly expressing behavior of the vehicle and also a quantity subject to the influence of the gradient of the road. Therefore, by estimating the stop time t4 based on this quantity, it is possible to perform adjustment control of the required brake axle torque in accordance with the steepness of the ascending slope in a manner that the correction duration td is shortened to quickly change the required brake axle torque when the ascending slope is steep, and in a manner that the correction duration td is prolonged to slowly change the required brake axle torque when the ascending slope is mild. Therefore, it is possible to reduce possibility that the vehicle goes back downward in the ascending slope.

In calculating the correction duration td, it is possible to use the detection signal of the acceleration sensor 9 instead of the detection signals of the wheel speed sensors 7 to estimate the stop time t4. However, at the timing at which the stop time t4 is estimated nose diving may be occurring since the timing is just before the vehicle stops. If the nose diving is occurring, error in the estimation becomes very large because the detection signal of the acceleration sensor 9 is affected significantly while the detection signals of the wheel speed sensors 7 are not. Therefore, it is good to use the wheel speed sensors 7.

The start timing t3 of the correction of the required brake axle torque at step 150 is a timing at which the speed of the vehicle on the ascending slope becomes smaller than the minimum detectable vehicular speed Vc. The timing at which the speed of the vehicle becomes smaller than the minimum detectable vehicular speed Vc is a timing at which the required brake axle torque coming closer to zero in accordance with the deceleration of the vehicle comes closest to zero. In other words, this is a timing at which increase control of the required brake axle torque aimed for suppressing the nose diving and the swinging back ends. By choosing this timing as the start timing, it is possible to maximize the effect of suppressing of the nose diving and the swinging back and have sufficient time to perform control for preventing the vehicle from going back downward.

Other Embodiment

Although an embodiment of the present invention is described as above, the scope of the present invention is not limited to the above embodiment and includes following various embodiments which can realize functions of the features of the present embodiment.

In the above embodiment, the vehicle is an automatic transmission vehicle having the engine 1 as the only power source of traveling, wherein the engine 1 serves as an internal combustion engine. However the present invention can be applied to a hybrid vehicle having an engine and an electric motor as power sources of traveling, and an electric vehicle having an electric motor as the only power source of traveling.

In these cases, the control portion 10 operates differently from the above embodiment as follows. If the vehicle is the hybrid vehicle or the electric vehicle, it is possible to cause the torque outputted by the powertrain to become 0 Nm just before the vehicle stops (when the vehicle is moving at a low speed) because it is possible to cause a creep force to become zero. In this case, as shown in FIG. 9, the least realizable powertrain torque 73 and the required powertrain axle torque 74 are 0 Nm. In the case that the creep force becomes zero and the torque in the positive direction is missing, the change of the required brake axle torque from the time t3 to the time t4 is the same as the above embodiment. Therefore, it is possible to prevent the vehicle from going back downward even if the present invention is applied to the hybrid vehicle or the electric vehicle.

In the above embodiments, the braking/driving cooperative control portion 145 includes the target axle torque FF calculation portion 41 and the target axle torque FB calculation portion 42. However, the portion 145 does not have to include the target axle torque FB calculation portion 42.

The target acceleration setting portion 144 and the braking/driving cooperative control portion 145 may be installed in the powertrain ECU 12 or in the brake ECU 13. Otherwise, the powertrain axle torque realizing portion 124, the brake axle torque realizing portion 134, the target acceleration setting portion 144, and the braking/driving cooperative control portion 145 may be installed in a common ECU. In these cases, communication of data (the required powertrain axle torque and the required brake axle torque) from the braking/driving cooperative control portion 145 to the powertrain axle torque realizing portion 124 and the brake axle torque realizing portion 134 can be made by data communication between software units using memory (RAM or the like) if a sender and receiver of the data is located in the same ECU.

In the above embodiments, as an example of brake control device, the drive support ECU 14 is described which calculates both of the required brake axle torque and the required powertrain axle torque based on the target acceleration. However, the brake control device of the present invention may calculate only the required brake axle torque among the required brake axle torque and the required powertrain axle torque. In other words, the brake control device of the present invention may be a device specialized for brake control of the vehicle.

In the above embodiments, the start timing of the correction process of the required brake axle torque at step 150 in FIG. 6 is a time t3 at which the detected vehicular speed becomes zero, that is a time t3 at which the detected vehicular speed becomes smaller than the minimum detectable vehicular speed Vc. However, the start timing of the required brake axle torque may differ from this time t3.

For example, if the start timing of the correction process of the required brake axle torque comes prior to the time t3, the required brake axle torque starts decreasing earlier than other cases in which this start timing does not come prior to the time t3. Although this slightly increases possibility of the nose diving and swinging back, this slightly decrease possibility that the vehicle goes back downward. With regard to the correction duration td in this case, the portion 43 estimates, based on the detected vehicular speed Vs and the detected acceleration a as at the start timing of the correction process prior to the time t3, a stop time at which the actual speed of the vehicle is expected to become zero, and identifies the period from the start timing of the correction process to the stop time t4 as the correction duration td. This correction duration td may be simply calculated by means of an equation td=|Vs/as|. Otherwise, the correction duration td may be calculated more precisely by using change of the required brake axle torque 65 from the start time of the correction process to the time t4.

If the correction duration td is a period until the stop time t4 estimated based on the detected vehicular velocity Vc and the detected acceleration a at or before the limit time t3, tendency is suppressed or removed in which the possibility that the vehicle go back downward increases as the gradient of the road becomes steeper. In this sense, if the start timing of the correction process of the required brake axle torque comes after the commencement of the soft stop control and before the vehicle completely stops (i.e. the actual speed becomes zero), the nose diving and the swinging back can be suppressed in any way and the tendency is suppressed or removed in which the possibility that the vehicle go back downward increases as the gradient of the road becomes steeper.

In the above embodiments, the absolute value of the final value B1 is the sum of the predetermined margin and the slope correction term, and the slope correction term is a torque generating a force for resisting a gravitational force applied to the vehicle in the longitudinal direction to the rear of the vehicle. However, this is not an indispensable feature. The final value B1 may have any value only if it is a torque with which the vehicle can stop at the ascending slope.

REFERENCE SIGNS LIST

1 engine
2 automatic transmission
3 brake actuator
6 wheel cylinder
7 wheel speed sensor
9 acceleration sensor
10 control portion
12 powertrain ECU
13 brake ECU
14 drive support ECU
41 target axle torque FF calculation portion
41*a* target resistance calculation portion
42 target axle torque FB calculation portion
43 reference acceleration calculation portion
144 target acceleration setting portion
144*a* soft acceleration setting portion
145 breaking/driving cooperative control portion

The invention claimed is:

1. A brake control device for a vehicle having a wheel speed sensor, comprising:
   a first means for calculating a required brake axle torque being an axle torque required to brake of the vehicle, wherein a microcomputer serves as the first means;
   a second means for causing a brake device of the vehicle to generate a brake pressure corresponding to the required brake axle torque calculated by the first means, wherein a microcomputer serves as the second means,
   wherein the first means:
   calculates the required brake axle torque so that the required brake axle torque comes closer to zero in accordance with deceleration of the vehicle when the vehicle decelerates on an ascending slope; and
   at a start timing after calculating the required brake axle torque, determines a final value which is farther apart from zero than the initial value is, and a correction duration, and causing the required brake axle torque to change from the initial value to the final value during the correction duration from the start timing, wherein:
   the final value is a torque with which the vehicle can stop at the ascending slope; and
   the correction duration is a period from a limit time to a stop time, the limit time being a last moment of a period in which the detected vehicular speed of the vehicle detected based on a detection signal of the wheel speed sensor is equal to or larger than a minimum detectable vehicular speed, the stop time being a time at which an actual speed of the vehicle becomes zero, and the stop time being estimated based on change in a detected vehicular speed at or before the limit time.

2. The brake control device according to claim 1, wherein the start timing is a timing at which the speed of the vehicle on the ascending slope becomes smaller than the minimum detectable vehicular speed.

3. A brake control device installed to a vehicle, comprising:
   a target acceleration setting portion for determining a target acceleration which the vehicle should achieve, wherein a microcomputer serves as the target acceleration setting portion; and
   a braking/driving cooperative control portion for calculating, based on the target acceleration determined by the target acceleration setting portion, a required powertrain axle torque required to power the vehicle and a required brake axle torque required to brake the vehicle, transmitting the calculated required powertrain axle torque to a powertrain axle torque realizing portion which performs control so that the powertrain of the vehicle generates the required powertrain axle torque, and transmitting the calculated required brake axle torque to a brake axle torque realizing portion which performs control so that a brake device of the vehicle generates a brake pressure corresponding to the required brake axle torque, wherein a microcomputer serves as the braking/driving cooperative control portion, wherein:
   a microcomputer serves as the powertrain axle torque realizing portion, a microcomputer serves as the brake axle torque realizing portion, the target acceleration setting portion calculates, when a speed of the vehicle on an ascending slope decreases to become equal to or smaller than a border vehicular speed, a negative soft acceleration which comes closer to zero in accordance with deceleration of the vehicle, identifies the calculated soft acceleration as the target acceleration, and keeps the soft acceleration constant after the vehicular speed becomes smaller than a minimum detectable vehicular speed of the wheel speed sensor;

the braking/driving cooperative control portion determines, at a timing at which the speed of the vehicle on the ascending slope becomes smaller than a minimum detectable vehicular speed of the wheel speed sensor, a negative initial value of the required brake axle torque, a negative final value, and a correction duration, and causes the required brake axle torque to change from the initial value to the final value during the correction duration from the timing;

the initial value is a required brake axle torque determined based on the target acceleration;

the final value is a torque with which the vehicle can stop at the ascending slope; and the braking/driving cooperative control portion estimates a stop time at which an actual speed of the vehicle becomes zero based on a detected vehicular speed at a limit time and a detected acceleration of the vehicle calculated by the detected vehicular speed, the limit time being a last moment of a period in which the detected vehicular speed of the vehicle detected based on a detection signal of the wheel speed sensor is equal to or larger than a minimum detectable vehicular speed, and the braking/driving cooperative control portion identifies a period from the limit time to the stop time as the correction duration.

* * * * *